(No Model.)
C. W. CROPP.
COMBINED LIGHTING AND HEATING APPARATUS.
No. 497,867. Patented May 23, 1893.
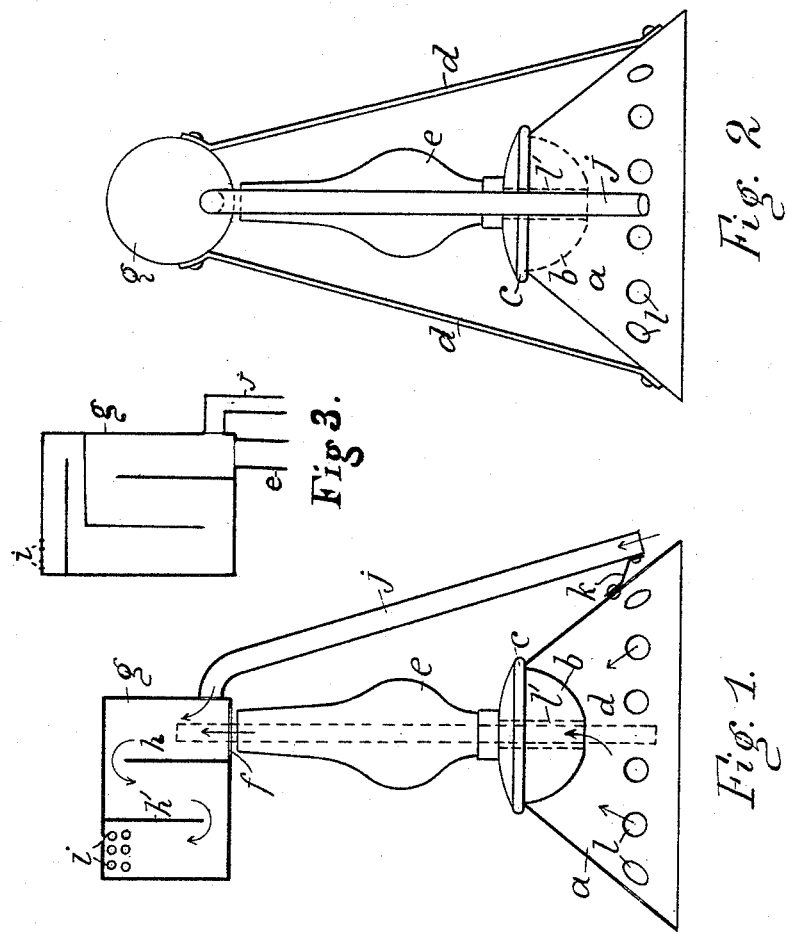

UNITED STATES PATENT OFFICE.

CHARLES W. CROPP, OF CHICAGO, ILLINOIS.

COMBINED LIGHTING AND HEATING APPARATUS.

SPECIFICATION forming part of Letters Patent No. 497,867, dated May 23, 1893.

Application filed February 8, 1893. Serial No. 461,423. (No model.)

*To all whom it may concern:*

Be it known that I, CHARLES W. CROPP, a subject of the Queen of Great Britain, residing at Chicago, in the county of Cook and State of Illinois, have invented certain new and useful Improvements in Combined Lighting and Heating Apparatus, which are fully set forth in the following specification, reference being had to the accompanying drawings, forming a part hereof, and in which—

Figure 1 shows my device in side elevation. Fig. 2 shows the same in end elevation. Fig. 3 shows a modified form of construction of the heating drum.

Like letters refer to like parts.

The object of my invention is to provide a simple convenient and cheap device by means of which a room may be warmed with its light producing mechanism. To attain said desirable ends I construct my said device in substantially the following manner, namely: I provide a truncated bottomless sheet-metal cone $a$ with air passages at or near its base, as, for example, with holes $l$. Into the upper end of said cone I place a lamp $b$, having a bead or shoulder $e$, resting on said cone and closing the end thereof. Said lamp is, preferably, a coal oil, or kerosene, lamp and one which is provided with an opening, or tube $l'$ through its center into the glass chimney $e$. Over the top of said chimney is a sheet-metal drum $g$ having an opening $f$, near one end thereof. Said drum is divided into a series of compartments by partitions $h\ h'$, which have holes through them alternating in position at the top and bottom for the passage of air, as indicated by the arrows. At the top of the third or last compartment, in this case, there are air-holes $i$. Through the head of the first compartment, near the hole $f$ enters a pipe $j$ of which the lower end reaches nearly to the base of the cone where it is held by a brace $k$. There are braces $d$, on opposite sides of the drum and pipe $j$, which, with said pipe, hold said drum securely upon said cone. The heat of the burning lamp causes an air draft through the holes $l$ and tube $l'$, chimney $e$ and drum $g$ which after being passed over and under said partitions escapes through the holes $i$. The motion of said air current creates a suction from the bottom of the cone end of the pipe $j$, as indicated by the arrows. This mechanism thus draws the lowest and coldest strata of air through it imparting thereto its heat which causes it to become the upper layer of air and thus it forces down to the floor the colder air which, in turn, passes through the described course until all the air has been passed through the lamp and heated and reheated thus quickly warming the room while at the same time the lamp lights the apartment. In Fig. 3 the drum $g$ is shown vertical and in section, as in Fig. 1, with both vertical and horizontal partition walls to lengthen the air passage through it.

What I claim is—

In a combined lighting and heating apparatus the combination with a truncated cone provided with holes near its base and a lamp with an air draft through its body and chimney, of a drum divided into compartments whereof the first compartment has an opening over the lamp-chimney and a pipe entering the first compartment of said drum and reaching to the base of the cone where it is open and secured to the cone, and braces on the sides of the drum forming the support thereof, said compartments of the drum having openings through them and the last compartments having air-holes, substantially as specified.

CHARLES W. CROPP.

Witnesses:
WM. ZIMMERMAN,
WALTER WAGNER.